(12) United States Patent
Maeshige et al.

(10) Patent No.: US 11,286,201 B2
(45) Date of Patent: Mar. 29, 2022

(54) COVER GLASS AND GLASS LAMINATE

(71) Applicant: AGC Inc., Tokyo (JP)

(72) Inventors: Kazunobu Maeshige, Tokyo (JP); Nobutaka Aomine, Tokyo (JP); Hiroyuki Okawa, Tokyo (JP); Kiyoshi Tamai, Tokyo (JP); Hitoshi Onoda, Tokyo (JP); Makoto Sano, Tokyo (JP); Yusuke Kobayashi, Tokyo (JP)

(73) Assignee: AGC Inc., Tokyo (JP)

( * ) Notice: Subject to any disclaimer, the term of this patent is extended or adjusted under 35 U.S.C. 154(b) by 1108 days.

(21) Appl. No.: 15/874,357

(22) Filed: Jan. 18, 2018

(65) Prior Publication Data

US 2018/0215659 A1 Aug. 2, 2018

Related U.S. Application Data

(60) Provisional application No. 62/452,402, filed on Jan. 31, 2017.

(51) Int. Cl.
*C03C 17/34* (2006.01)
*B32B 17/10* (2006.01)
(Continued)

(52) U.S. Cl.
CPC .... *C03C 17/3435* (2013.01); *B32B 17/10137* (2013.01); *B32B 33/00* (2013.01); *C03C 3/087* (2013.01); *C03C 17/02* (2013.01); *C03C 17/225* (2013.01); *B32B 2250/42* (2013.01); *B32B 2255/20* (2013.01); *B32B 2307/558* (2013.01); *B32B 2307/584* (2013.01); *B32B 2313/00* (2013.01); *B32B 2315/08* (2013.01);
(Continued)

(58) Field of Classification Search
CPC ........ C03C 2217/734; B32B 17/10137; B32B 2250/42; B32B 2255/20; B32B 2307/558; B32B 2307/584; B32B 2313/00; B32B 2315/08; B32B 2457/20; B32B 33/00
See application file for complete search history.

(56) References Cited

U.S. PATENT DOCUMENTS

| 5,646,781 A * | 7/1997 | Johnson, Jr. ........... G02C 7/104 |
| | | 359/589 |
| 5,930,046 A * | 7/1999 | Solberg ................. C23C 14/083 |
| | | 359/580 |

(Continued)

FOREIGN PATENT DOCUMENTS

| CN | 101639663 A | 2/2010 |
| CN | 206605867 U | 11/2017 |

(Continued)

*Primary Examiner* — Alicia J Sawdon
(74) *Attorney, Agent, or Firm* — Oblon, McClelland, Maier & Neustadt, L.L.P.

(57) ABSTRACT

The present invention provides a cover glass and a glass laminate which are reduced in warpage, and have excellent scratch resistance, low reflecting properties and excellent optical properties. According to the present invention, a cover glass and a glass laminate which are reduced in glass warpage, retain the effect of scratch resistance, and have low reflecting properties and excellent optical properties can be provided by alternately superposing a film including a high-refractive-index material and a film including a low-refractive-index material, in given amounts.

26 Claims, 1 Drawing Sheet

(51) Int. Cl.
  *B32B 33/00* (2006.01)
  *C03C 17/22* (2006.01)
  *C03C 17/02* (2006.01)
  *C03C 3/087* (2006.01)
  *G03B 27/62* (2006.01)
  *C03C 21/00* (2006.01)
  *C03C 23/00* (2006.01)

(52) U.S. Cl.
  CPC ........ *B32B 2457/20* (2013.01); *C03C 21/001* (2013.01); *C03C 23/0075* (2013.01); *C03C 2217/734* (2013.01); *G03B 27/6228* (2013.01)

(56) References Cited

U.S. PATENT DOCUMENTS

| | | |
|---|---|---|
| 6,450,025 B1 | 9/2002 | Wado et al. |
| 2010/0027383 A1* | 2/2010 | Suzuki .................. G02B 1/115 368/276 |
| 2011/0154861 A1* | 6/2011 | Kishimoto .............. C23C 14/10 65/60.1 |
| 2013/0127202 A1 | 5/2013 | Hart |
| 2013/0260115 A1 | 10/2013 | Suzuki et al. |
| 2018/0372919 A1 | 12/2018 | Suzuki et al. |

FOREIGN PATENT DOCUMENTS

| | | |
|---|---|---|
| JP | 11-271123 A | 10/1999 |
| JP | 2000-211053 A | 8/2000 |
| JP | 2004-271480 A | 9/2004 |
| JP | 2015-507588 A | 3/2015 |
| JP | 2015-084103 A | 4/2015 |
| WO | WO 2015-041257 A1 | 3/2015 |

\* cited by examiner

COVER GLASS AND GLASS LAMINATE

TECHNICAL FIELD

The present invention relates to a cover glass and a glass laminate which are reduced in warpage and have excellent scratch resistance.

BACKGROUND ART

In flat panel display devices and touch panel display devices for use in digital cameras, mobile phones, personal digital assistants (PDAs), etc., a thin sheet-shaped cover glass is disposed on the front surface of the display over a region extending beyond the image display portion, in order to protect the displays and enhance the appearance thereof. Although high in theoretical strength, the glass decreases in strength considerably upon scratching. Because of this, a chemically strengthened glass in which a compressive stress layer has been formed in each of the front and back surfaces by ion exchange or the like is used as such cover glasses required to have strength.

In cases when high hardness and scratch resistance are required of a surface of a cover glass, a layer having impact resistance is sometimes deposited as an outermost layer of the cover glass. For example, a strengthened-glass laminate is known in which a coating having asymmetric impact resistance has been provided to a surface of the strengthened glass (Patent Document 1).

BACKGROUND-ART DOCUMENTS

Patent Documents

[Patent Document 1] JP-T-2015-507588

SUMMARY OF THE INVENTION

Problems that the Invention is to Solve

The strengthened-glass laminate described in Patent Document 1 is intended for application to windows of motor vehicles or airplanes, and a thick glass sheet is used therein. Meanwhile, in cases when the strengthened-glass laminate is produced as a cover glass for electronic terminals such as, for example, digital cameras, mobile phones, or personal digital assistants (PDAs), it is necessary to reduce the thickness of the glass and the strengthened-glass laminate thus obtained is undesirably in a warped state.

Accordingly, an object of the present invention is to provide a cover glass and a glass laminate which not only have excellent scratch resistance but also are reduced in warpage.

Means for Solving the Problems

The present inventors diligently made investigations and, as a result, have found that a cover glass and a glass laminate which are reduced in warpage and have excellent scratch resistance are obtained even from a thin glass sheet, by alternately superposing a film including a high-refractive-index material and a film including a low-refractive-index material to thereby form a plurality of layers of each material on at least one surface of the glass sheet. The present invention has been thus completed.

Namely, the present invention relates to the following items <1> to <19>.

<1> A cover glass including a glass sheet and an inorganic film superposed on at least one surface of the glass sheet, in which the glass sheet has a thickness of 1 mm or less, the inorganic film is a multilayer film including six or more layers formed by alternately superposing a film including a high-refractive-index material having a refractive index at 632-nm wavelength of 1.80 or higher and a film including a low-refractive-index material having a refractive index at the wavelength of less than 1.80, the films including the high-refractive-index material and the films including the low-refractive-index material each having a single-film thickness of 5 nm to 250 nm, the six or more superposed layers having a total thickness of 850 nm to 6,000 nm, and a warpage change between a warpage amount of the glass sheet by itself and a warpage amount of the cover glass including the superposed inorganic film is 30% or less.

<2> A cover glass including a glass sheet and an inorganic film superposed on at least one surface of the glass sheet, in which the glass sheet has a thickness of 1 mm or less, the inorganic film includes six or more layers formed by alternately superposing a film including a high-refractive-index material having a refractive index at 632-nm wavelength of 1.80 or higher and a film including a low-refractive-index material having a refractive index at the wavelength of less than 1.80, the films including the high-refractive-index material and the films including the low-refractive-index material each having a single-film thickness of 5 nm to 250 nm, the inorganic film having an overall thickness of 850 nm to 6,000 nm, and when the cover glass is placed on a horizontal platen so that one main surface of the cover glass is in contact with the platen and warpage amounts of the cover glass, which are amounts in which four corners of the cover glass have lifted from the platen, are measured with a gap gauge at 20° C., then an average value of the warpage amounts is 400 µm or less.

<3> The cover glass according to <1> or <2>, in which the high-refractive-index material is silicon nitride.

<4> The cover glass according to any one of <1> to <3>, in which the low-refractive-index material is silicon oxide.

<5> The cover glass according to any one of <1> to <4>, in which the single-film thickness of the film including the low-refractive-index material is smaller than the single-film thickness of the film including the high-refractive-index material.

<6> The cover glass according to any one of <1> to <5>, in which a film including the high-refractive-index material has been superposed over an outermost surface of the glass sheet, with a film including the low-refractive-index material interposed therebetween.

<7> The cover glass according to any one of <1> to <6>, in which the overall thickness of the inorganic film is 850 nm to 3,000 nm.

<8> The cover glass according to any one of <1> to <7>, in which the glass sheet is a chemically strengthened glass sheet having a compressive stress layer as a surface layer.

<9> The cover glass according to any one of <1> to <8>, further including an antifouling film disposed on a surface of the inorganic film.

<10> The cover glass according to any one of <1> to <10>, which is for electronic terminals.

<11> A glass laminate including a glass sheet and an inorganic film superposed on at least one surface of the glass sheet,
in which the inorganic film includes six or more layers formed by alternately superposing a film including a high-refractive-index material having a refractive index at 632- nm wavelength of 1.80 or higher and a film including a low-refractive-index material having a refractive index at the wavelength of less than 1.80, the films including the high-refractive-index material and the films including the low-refractive-index material each having a single-film thickness of 5 nm to 250 nm, the inorganic film having an overall thickness of 850 nm to 6,000 nm, and an absolute value of product obtained by multiplying the overall thickness of the inorganic film by an overall stress value of the inorganic film is $220 \times 10^3$ nm·MPa or less.

<12> A glass laminate including a glass sheet and an inorganic film superposed on at least one surface of the glass sheet, in which the inorganic film includes six or more layers formed by alternately superposing a film including a high-refractive-index material having a refractive index at 632-nm wavelength of 1.80 or higher and a film including a low-refractive-index material having a refractive index at the wavelength of less than 1.80, the films including the high-refractive-index material and the films including the low-refractive-index material each having a single-film thickness of 5 nm to 250 nm, the inorganic film having an overall thickness of 850 nm to 6,000 nm, and an absolute value of an overall stress value of the inorganic film is 80 MPa or less.

<13> The glass laminate according to <11> or <12>, in which an absolute value of a stress value of the film including the high-refractive-index material is smaller than an absolute value of a stress value of the film including the low-refractive-index material.

<14> The glass laminate according to any one of <11> to <13>, in which the stress value of the film including the high-refractive-index material is larger than the stress value of the film including the low-refractive-index material.

<15> The glass laminate according to any one of <11> to <14>, in which the absolute value of the product obtained by multiplying the overall thickness of the inorganic film by the overall stress value of the inorganic film is $100 \times 10^3$ nm·MPa or less.

<16> The glass laminate according to any one of <11> to <15>, in which the films including the high-refractive-index material each have a single-film stress value, an absolute value of which is 30-250 MPa.

<17> The glass laminate according to any one of <11> to <16>, in which the films including the low-refractive-index material each have a single-film stress value, an absolute value of which is 100-300 MPa.

<18> The glass laminate according to any one of <11> to <17>, in which the absolute value of the overall stress value of the inorganic film is 35 MPa or less.

<19> The glass laminate according to any one of <11> to <18>, in which the absolute value of the overall stress value of the inorganic film is 25 MPa or less.

Advantages of the Invention

According to the present invention, a cover glass and a glass laminate which are reduced in glass warpage, retain the effect of scratch resistance, and have low reflecting properties and excellent optical properties can be provided by alternately superposing a film including a high-refractive-index material and a film including a low-refractive-index material, in given amounts.

MODES FOR CARRYING OUT THE INVENTION

Figure 1:
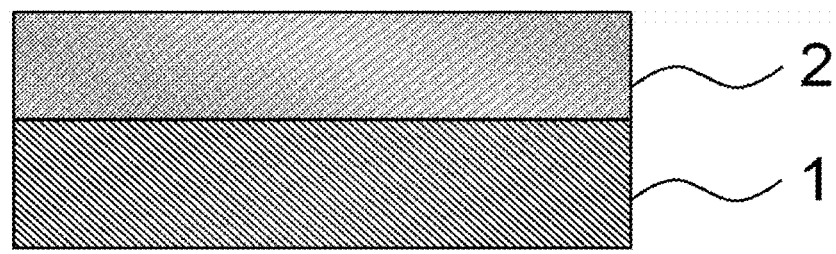
FIG. 1 is a cross-sectional view showing the structure of a conventional glass laminate.

The present invention is hereunder described in detail, but it should not be construed that the present invention is limited to the following embodiments, and the present invention may be arbitrarily modified and carried out within the range where the gist of the present invention is not deviated.

In this description, each "-" used for indicating a numerical range means that the numerical values that precede and succeed the symbol are included in the range as the lower limit and the upper limit.

<Cover Glass and Glass Laminate>

The cover glass and glass laminate of the present invention each include a glass sheet and an inorganic film superposed on at least one surface of the glass sheet.

The glass sheet has a thickness of 1 mm or less.

The inorganic film includes six or more layers formed by alternately superposing a film including a high-refractive-index material and a film including a low-refractive-index material. The high-refractive-index material is a material having a refractive index at 632-nm wavelength of 1.80 or higher, and the low-refractive-index material is a material having a refractive index at the wavelength of less than 1.80.

In this multilayer film, the films including the high-refractive-index material and the films including the low-refractive-index material each have a single-film thickness of 5 nm to 250 nm, and the six or more superposed layers have a total thickness of 850 nm to 6,000 nm.

The cover glass of the present invention has a warpage change of 30% or less, the warpage change being determined from the warpage amount of the glass sheet by itself, on which the inorganic film has not been superposed, and from the warpage amount of the cover glass, on which the inorganic film has been superposed.

Furthermore, the cover glass of the present invention satisfies the following: when the cover glass is placed on a horizontal platen so that one main surface of the cover glass is in contact with the platen and the warpage amounts of the cover glass, which are the amounts in which the four corners of the cover glass have lifted from the platen, are measured with a gap gauge at 20° C., then the average value of the warpage amounts is 400 μm or less.

The glass laminate of the present invention is one in which the absolute value of the product obtained by multiplying the overall thickness of the inorganic film by the overall stress value of the inorganic film is $220 \times 10^3$ nm·MPa or less, and in which the absolute value of the overall stress value of the inorganic film is 80 MPa or less.

(Glass Sheet)

The glass sheet as a component of each of the cover glass and glass laminate according to the present invention has a thickness of 1 mm or less. Glass sheets themselves having thicknesses larger than 1 mm have high rigidity and are less apt to warp in themselves. It is preferable that the thickness of the glass sheet is 0.8 mm or less, from the standpoint that not only the weight of the cover glass can be reduced but also the effect of reducing the warpage change by, for example, the coating with the inorganic film is apt to be obtained.

A lower limit of the thickness thereof is preferably 0.2 mm or larger, more preferably 0.3 mm or larger.

Although the kind of the glass sheet is not particularly limited, it is preferable that the glass sheet is a chemically strengthened glass sheet which has undergone a chemical strengthening (ion exchange) treatment and has a compressive stress layer in the surfaces. In the case of performing ion exchange, the glass sheet preferably contains at least one of lithium and sodium, and more preferably contains sodium. This is because in the step of ion exchange in the chemical strengthening treatment, the presence of such ions is advantageous for ion-exchanging the glass surfaces to form a surface layer in which compressive stress remains.

Specifically, at a temperature not higher than the glass transition temperature, alkali metal ions having a small ionic radius (Li ions or Na ions) in the surfaces of the glass sheet are replaced with alkali ions having a larger ionic radius (Na ions or K ions) by ion exchange. As a result, compressive stress remains in the surfaces of the glass to improve the surface strength of the glass sheet.

The glass composition of the glass sheet is not particularly limited. For example, however, an aluminosilicate glass, an aluminoborosilicate glass, a soda-lime glass, or the like can be advantageously used.

Specific glass compositions are shown below.
(i) A glass having a composition including, in terms of mol % on the basis of oxides, 50-80% $SiO_2$, 2-25% $Al_2O_3$, 0-10% $Li_2O$, 0-18% $Na_2O$, 0-10% $K_2O$, 0-15% MgO, 0-5% CaO, and 0-5% $ZrO_2$.
(ii) A glass having a composition including, in terms of mol % on the basis of oxides, 50-74% $SiO_2$, 1-10% $Al_2O_3$, 6-14% $Na_2O$, 3-11% $K_2O$, 2-15% MgO, 0-6% CaO, and 0-5% $ZrO_2$, in which the total content of $SiO_2$ and $Al_2O_3$ is 75% or less, the total content of $Na_2O$ and $K_2O$ is 12-25%, and the total content of MgO and CaO is 7-15%.
(iii) A glass having a composition including, in terms of mol % on the basis of oxides, 68-80% $SiO_2$, 4-10% $Al_2O_3$, 5-15% $Na_2O$, 0-1% $K_2O$, 4-15% MgO, and 0-1% $ZrO_2$.
(iv) A glass having a composition including, in terms of mol % on the basis of oxides, 67-75% $SiO_2$, 0-4% $Al_2O_3$, 7-15% $Na_2O$, 1-9% $K_2O$, 6-14% MgO, and 0-1.5% $ZrO_2$, in which the total content of $SiO_2$ and $Al_2O_3$ is 71-75%, the total content of $Na_2O$ and $K_2O$ is 12-20%, and the content of CaO, if any, is less than 1%.
(v) A glass having a composition including, in terms of mass % on the basis of oxides, 65-75% $SiO_2$, 0.1-5% $Al_2O_3$, 1-6% MgO, and 1-15% CaO, in which $Na_2O+K_2O$ is 10-18%.
(vi) A glass having a composition including, in terms of mass % on the basis of oxides, 65-72% $SiO_2$, 3.4-8.6% $Al_2O_3$, 6.5-9% CaO, 13-16% $Na_2O$, 0-1% $K_2O$, 0-0.2% $TiO_2$, 0.01-0.15% $Fe_2O_3$, and 0.02-0.4% $SO_3$, in which $(Na_2O+K_2O)/Al_2O_3$ is 1.8-5.0.
(vii) A glass having a composition including, in terms of mass % on the basis of oxides, 60-72% $SiO_2$, 1-10% $Al_2O_3$, 5-12% MgO, 0.1-5% CaO, 13-19% $Na_2O$, and 0-5% $K_2O$, in which $RO/(RO+R_2O)$ is 0.20-0.42 (in which RO represents an alkaline-earth metal oxide and $R_{2O}$ represents an alkali metal oxide).

Methods for producing the glass sheet are not particularly limited. The glass sheet can be produced by introducing desired raw materials for glass into a continuous melting furnace, heating and melting the raw materials for glass preferably at 1,500-1,600° C., refining the melt, subsequently feeding the refined melt to a shaping device to shape the molten glass into a sheet shape, and annealing the sheet.

Various methods may be employed for glass shaping. For example, use can be made of various shaping processes such as down-draw processes (e.g., an overflow down-draw process, slot-down process, and redraw process), a float process, a roll-out process, and a pressing process.

(High-Refractive-Index Material)

The cover glass and glass laminate according to the present invention each include an inorganic film superposed on at least one surface of the glass sheet.

Although the inorganic film includes six or more layers formed by alternately superposing a film including a high-refractive-index material and a film including a low-refractive-index material, the high-refractive-index material may be any material having a refractive index at 632-nm wavelength of 1.80 or higher. The refractive index thereof is preferably 1.85 or higher, more preferably 1.90 or higher, further preferably 1.92 or higher, even more preferably 1.95 or higher, and is especially preferably 1.97 or higher from the standpoint of optical regulation.

Examples of the high-refractive-index material include nitrides, oxynitrides, and oxides of one or more elements selected from the group consisting of Si, Al, Ti, Ta, Hf, and Zr. One of these compounds may be used alone, or two or more thereof may be used.

Of these, silicon nitride ($SiN_x$) is more preferred since this compound has high hardness and a cover glass having improved scratch resistance is obtained therewith. Incidentally, the refractive index of silicon nitride at a wavelength of 632 nm is 1.95. In the present invention, refractive index can be measured by ellipsometry.

Each film (high-refractive film) including the high-refractive-index material is a film having a single-film thickness of 5 nm to 250 nm, and three or more layers thereof are superposed. The single-film thickness of the high-refractive films can be measured through an SEM examination of a cross-section.

Methods for depositing the high-refractive films are not particularly limited. For example, use can be made of a sputtering method, an after-reaction sputtering method, or the like. Examples of the after-reaction sputtering method include a radical-assisted sputtering method (see U.S. Pat. No. 6,103,320) and the MetaMode method (see Japanese Patent No. 5783613). The after-reaction sputtering method is more preferred because the kind of stress (compressive stress or tensile stress) and the magnitude of the stress can be regulated for each single film in the method.

In the case of depositing, for example, a silicon nitride film, p-Si is used as a silicon target and sputtering is conducted in a nitrogen atmosphere. The film to be obtained is varied in film thickness, crystal structure, property, etc. by changing conditions for the sputtering, such as deposition period, sputtering power, gas flow rate, substrate temperature, etc. The sputtering is hence conducted under suitably regulated optimal conditions.

(Low-Refractive-Index Material)

The films (low-refractive films) including a low-refractive-index material contribute to low reflecting properties. In addition, scratch propagation can be stopped at the interfaces between a high-refractive film and a low-refractive film. The low-refractive films are hence preferred also from the standpoint of further improving the scratch resistance of the cover glass.

The low-refractive-index material may be any material having a lower refractive index at 632-nm wavelength than the high-refractive-index material. The refractive index thereof hence is less than 1.80. The refractive index thereof is preferably 1.50 or less from the standpoint of optical-property regulation, and is more preferably 1.48 or less, further preferably 1.45 or less, even more preferably 1.40 or less, especially preferably 1.35 or less.

Examples of the low-refractive-index material include oxides of one or more elements selected from the group consisting of Si, Al, and Zr. One of these compounds may be used alone, or two or more thereof may be used.

Of these, silicon oxide ($SiO_2$) and aluminum oxide ($Al_2O_3$) are more preferred since a cover glass having a further reduced reflectance can be obtained therewith. Incidentally, the refractive index of silicon oxide at a wavelength of 632 nm is 1.47, and the refractive index of aluminum oxide at a wavelength of 632 nm is 1.67.

Three or more layers of the low-refractive film are superposed, in which the single-film thicknesses are each 5 nm to 250 nm. It is preferable that the single-film thickness of the low-refractive film is smaller than the single-film thickness of the high-refractive film, from the standpoint that this configuration is effective in further reducing warpage. The single-film thickness of the low-refractive film can be measured with a contact type film thickness meter or through an SEM examination of a cross-section in the case of a single film alone, or can be determined by a measurement by ellipsometry, etc. in the case of superposed layers.

Methods for depositing the low-refractive films are not particularly limited. For example, use can be made of a sputtering method, an after-reaction sputtering method, or the like. The after-reaction sputtering method is more preferred because the kind of stress (compressive stress or tensile stress) and the magnitude of the stress can be regulated for each single film in the method.

In the case of depositing, for example, a silicon oxide film, p-Si is used as a silicon target and sputtering is conducted in an oxygen atmosphere. The film to be obtained is varied in film thickness, crystal structure, property, etc. by changing conditions for the sputtering, such as deposition period, sputtering power, gas flow rate, substrate temperature, etc. The sputtering is hence conducted under suitably regulated optimal conditions.

The after-reaction sputtering method may be used to deposit, for example, high-refractive films as tensile stress layers and low-refractive films as compressive stress layers. It is thought that a cover glass and a glass laminate can be thus obtained in which the tensile stress of the high-refractive films and the compressive stress of the low-refractive films countervail each other and which are remarkably inhibited from warping. It is thought that even a cover glass and a glass laminate which are completely free from warpage can be obtained.

(Inorganic Film)

Figure 2:
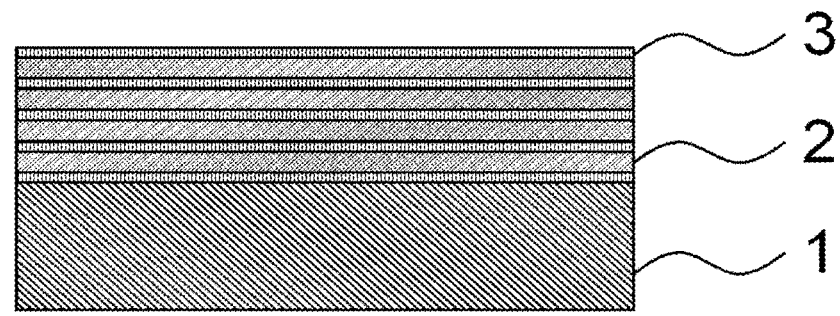
FIG. 2 is a cross-sectional view showing the structure of one embodiment of the cover glass according to the present invention, in which a film including a high-refractive-index material and a film including a low-refractive-index material have been alternately superposed to form nine layers.

High-refractive films and low-refractive films are alternately superposed (see FIG. 2). Due to this configuration, scratch propagation is apt to be stopped at the interfaces between the superposed layers, resulting in an improvement in scratch resistance. It is preferable that a low-refractive film is superposed on the outermost surface of the glass sheet and a high-refractive film is superposed on this low-refractive film, because satisfactory film adhesion is attained thereby.

In case where the thickness of each single film (single-film thickness) of the high-refractive films and low-refractive films exceeds 250 nm, the compressive stress or tensile stress per single film is so high that the glass sheet is prone to warp. Meanwhile, in cases when the single-film thickness is regulated to 250 nm or less, the compressive stress or tensile stress per single film is low and the glass sheet is less apt to warp even when a plurality of such single films are superposed. Namely, a comparison between the value of compressive stress or tensile stress of the whole of a multilayer film formed by superposing multiple single films each having a thickness of 250 nm or less so as to result in a given total thickness and the value of compressive stress or tensile stress of a single film (one layer) which is a high-refractive film or low-refractive film and has the same given thickness (see FIG. 1) shows that the inorganic film according to the present invention obtained by superposing multiple layers has a far smaller value and is capable of reducing or eliminating the warpage of the glass sheet.

In the case where, for example, the low-refractive films are compressive stress layers, it is more preferable that the high-refractive films are tensile stress layers. This is because force is exerted so that these two kinds of stress countervail each other, and the warpage of the cover glass can be further reduced.

The inorganic film is a multilayer film including six or more superposed single films and having a total film thickness (overall thickness of the inorganic film) of 850 nm to 6,000 nm. By thus regulating the number of films and the film thickness, excellent scratch resistance can be obtained.

The total number of superposed layers which are high-refractive films and low-refractive layers is preferably 20 or larger (ten or more high-refractive films and ten or more low-refractive films), more preferably 40 or larger (twenty or more high-refractive films and twenty or more low-refractive films), from the standpoint of the interfacial effect of inhibiting scratch propagation. Meanwhile, an upper limit thereof is usually 100 or less (up to fifty high-refractive films and up to fifty low-refractive films).

The outermost surface of the cover glass according to the present invention or the outermost surface of the inorganic film may be either a high-refractive film or a low-refractive film. It is, however, preferable that the outermost surface is a low-refractive film, from the standpoint of obtaining a cover glass having a higher transmittance. In the case where an antifouling film having at least one property, such as oil repellency or oleophilicity, is further formed on the outermost surface of the cover glass, it is preferable that the outermost surface of the inorganic film is a low-refractive film, also from the standpoint of adhesion to the antifouling film. Namely, it is more preferable that a low-refractive film is superposed on the outermost surface of the glass sheet and a high-refractive film is superposed on this low-refractive film and that the outermost surface of the cover glass or the outermost surface of the inorganic film is a low-refractive film. In this case, the total number of superposed high-refractive films and low-refractive films in the inorganic film is an odd number.

The total thickness of the films may be any value not less than 850 nm, and is preferably 1,000 nm or larger, more preferably 1,500 nm or larger, from the standpoint of ensuring strength. The upper limit thereof is 6,000 nm or less, preferably 3,000 nm or less, more preferably 2,500 nm or less, from the standpoint of optical property. For example, a more preferred combination regarding the total thickness of the films is 850 nm to 3,000 nm. The expression "the thickness of the superposed inorganic film" means the sum of the single-film thicknesses of the high-refractive films and the low-refractive films.

Although the single-film thicknesses of the high-refractive films and low-refractive films each may be any value of 5 nm to 250 nm, it is preferable that the total single-film thickness of the high-refractive films is larger than the total single-film thickness of the low-refractive films.

For example, in the case where the inorganic film has an overall thickness of 2,000 nm, the total thickness of the high-refractive films is preferably 1,200 nm or larger, more preferably 1,500 nm or larger. Meanwhile, in the case where the inorganic film has an overall thickness of 3,000 nm, the total thickness of the high-refractive films is preferably 1,800 nm or larger, more preferably 2,000 nm or larger.

In the high-refractive films and in the low-refractive films, the single films may have the same thickness or different thicknesses. Furthermore, the single films may be equal to or different from each other in the high-refractive-index material or low-refractive-index material which constitutes the single films.

It is more preferable that an antifouling film is further provided to the surface of the inorganic film superposed on the glass sheet, that is, so as to constitute an outermost surface of the cover glass. The antifouling film may by any film having at least one property selected from the group consisting of antifouling properties, water repellency, oil repellency, and oleophilicity. Examples thereof include fluorine-containing organic compounds. More specific examples thereof include fluorine-containing organosilicon compounds and fluorine-containing organic compounds having hydrolyzability.

By forming an antifouling film so as to constitute an outermost surface of the cover glass, the cover glass can be made to have functions, such as inhibiting the adhesion of various soils including fingerprints, sweat, and dust, facilitating removal of soils by wiping, and making the soils less noticeable, and to keep the display surface clean. In addition, it is also possible to obtain smooth finger sliding with no sticking when operating the touch panel.

<Process for Producing the Cover Glass and the Glass Laminate>

The cover glass and glass laminate according to the present invention can be produced by disposing the inorganic film on at least one surface of a glass sheet.

It is preferable that the glass sheet is a chemically strengthened glass sheet having a compressive stress layer as a surface layer. A chemical strengthening treatment can be conducted by a conventionally known method. A chemically strengthened glass is produced, for example, by conducting the following steps (a) to (c).

(a) A step in which a glass sheet containing sodium is brought into contact with inorganic salts including potassium nitrate and at least one salt selected from the group consisting of $K_2CO_3$, $Na_2CO_3$, $KHCO_3$, and $NaHCO_3$, thereby performing ion exchange between the sodium contained in the glass sheet and the potassium contained in the inorganic salts; (b) a step in which the glass sheet which has undergone the ion exchange is brought into contact with an acid; and (c) a step in which the glass sheet which has been contacted with the acid is brought into contact with an alkali.

This process may suitably include a step for performing washing and drying between the steps (a) to (c).

(Preparation of Molten Salts)

Potassium nitrate has a melting point of 330° C., which is below the strain point (usually 500-600° C.) of the glass to be chemically strengthened. Meanwhile, salts such as $K_2CO_3$, $Na_2CO_3$, $KHCO_3$, and $NaHCO_3$ (hereinafter sometimes referred to also as "flux") have the property of cutting the network of glass represented by Si—O—Si bonds. Since the temperature at which the chemical strengthening treatment is conducted is as high as several hundred degrees centigrade, covalent Si—O bonds of the glass are moderately cut at that temperature to facilitate the density reduction treatment which will be described later.

The degree in which the covalent bonds are to be cut varies depending on the glass composition and the conditions for the chemical strengthening treatment, such as the kinds of the salts (flux) to be used, temperature at which the chemical strengthening treatment is to be performed, period of the treatment, etc. However, it is thought to be preferred to select conditions under which one or two of the four covalent bonds extending from the Si atom are cut.

As a result of the ion exchange between Na ions (or Li ions) in the glass surfaces and K ions (or Na ions) in the inorganic salts, a high-density compressive stress layer is formed. As a method for bringing the glass into contact with the inorganic salts, use can be made, for example, of a method in which the inorganic salts in a paste state are applied, a method in which an aqueous solution of the inorganic salts is sprayed on the glass, and a method in which the glass is immersed in a bath of the molten salts heated to or above the melting points. Of these, the method in which the glass is immersed in the molten salts is desirable.

The amount of the flux to be added is preferably 0.1 mol % or larger, more preferably 0.5 mol % or larger, even more preferably 1 mol % or larger, especially preferably 2 mol % or larger, from the standpoint of controlling the surface hydrogen concentration. Meanwhile, from the standpoint of production efficiency, it is preferable that the salts each are added in an amount not larger than the saturation solubility thereof. There is a possibility that excessive addition might lead to glass corrosion. In the case of using, for example, $K_2CO_3$ as a flux, the amount thereof is preferably 24 mol % or less, more preferably 12 mol % or less, especially preferably 8 mol % or less.

The inorganic salts may contain other chemical species, besides potassium nitrate and the flux, so long as the inclusion thereof does not lessen the effects of the present invention. Examples thereof include alkali chlorides and alkali borates, such as sodium chloride, potassium chloride, sodium borate, and potassium borate. One of these may be added alone, or two or more thereof may be added in combination.

The molten salts can be produced by known steps. Namely, the molten salts can be obtained by preparing molten potassium nitrate and then adding a flux to the molten potassium nitrate. In another method, the molten salts can be obtained by mixing potassium nitrate with a flux and melting this salt mixture of potassium nitrate and the flux.

(Step (a): Step of Ion Exchange)

Next, the prepared molten salts are used to conduct a chemical strengthening treatment. The chemical strengthening treatment is conducted by immersing the glass sheet in the molten salts to cause Na ions (or Li ions) in the glass to undergo ion exchange (to be replaced) with K ions (or Na ions) present in the molten salts. By this ion exchange, the composition of the glass sheet surfaces is changed and a compressive stress layer can be formed through the densification of the glass sheet surfaces. Since compressive stress generates upon this densification of the glass sheet surfaces, the glass sheet can be strengthened.

Actually, however, there is no clear boundary where the density changes abruptly between the interlayer (bulk) present in the middle of the glass sheet and each of the compressive stress layers, because the density increases gradually from the periphery of the interlayer toward the surface of the compressive stress layer. The term "interlayer" means the layer which is present in the middle of the glass sheet and is sandwiched between the compressive stress layers. Unlike the compressive stress layers, this interlayer is a layer which has not undergone ion exchange.

The chemical strengthening treatment (step of ion exchange) in the present invention is conducted specifically by the following procedure.

First, the glass sheet is preheated, and the molten salts described above are regulated so as to have a temperature at which chemical strengthening is to be conducted. Subsequently, the preheated glass sheet is immersed in the molten salts for a given time period, and the glass sheet is then drawn up from the molten salts and allowed to cool. It is preferable that the glass sheet is subjected, before the chemical strengthening treatment, to shaping according to the use thereof, such as mechanical processing, e.g., cutting, end surface machining, and drilling.

The preheating temperature for the glass sheet depends on the temperature at which the glass sheet is to be immersed in the molten salts. In general, however, the preheating temperature is preferably 100° C. or higher.

The chemical strengthening temperature is preferably not higher than the strain point of the glass to be strengthened (usually 500-600° C.). From the standpoint of obtaining a greater depth of the compressive stress layer (DOL), the chemical strengthening temperature is especially preferably 350° C. or higher. From the standpoints of shortening the treatment period and regulating the depth of the compressive stress layer (DOL) so as not be too large, the chemical strengthening temperature is more preferably 450° C. or higher, even more preferably 470° C. or higher.

The period of immersing the glass sheet in the molten salts is preferably 1 minute to 10 hours, more preferably 5 minutes to 8 hours, even more preferably 10 minutes to 4 hours. Such a range is preferred because a chemically strengthened glass sheet having an excellent balance between the strength and the depth of the compressive stress layer can be obtained.

In the production process according to the present invention, it is preferred to wash the glass sheet after the step of ion exchange. In the step of washing, the glass is washed using industrial water, ion-exchanged water, or the like. The industrial water is treated according to need before use. Of these, ion-exchanged water is preferred.

Conditions for the washing vary depending on the washing liquid to be used. In the case of using ion-exchanged water, it is preferred to wash the glass sheet at 0-100° C., from the standpoint of completely removing the adherent salts.

For the step of washing, various methods can be used, such as a method in which the chemically strengthened glass sheet is immersed in a water tank containing ion-exchanged water or the like, a method in which the glass sheet surfaces are exposed to running water, and a method in which a washing liquid is sprayed on the glass sheet surfaces with a shower.

(Step (b): Step of Contacting with Acid)

In the production process according to the present invention, a step in which the glass sheet is brought into contact with an acid (acid treatment step) is conducted after the step of washing described above.

The acid treatment of the glass sheet is conducted by immersing the glass sheet which has undergone the chemical strengthening treatment in an acidic solution. By this treatment, Na and/or K in the surfaces of the glass sheet which has undergone the chemical strengthening treatment can be replaced with H. Thus, the glass sheet surfaces come to further have a low-density layer formed by altering a surface layer of each compressive stress layer, specifically, by reducing the density of the surface layer.

The solution is not particularly limited so long as the solution is acidic and has a pH of less than 7. Either a weak acid or a strong acid may be used. Specifically, examples of preferred acids include hydrochloric acid, nitric acid, sulfuric acid, phosphoric acid, acetic acid, oxalic acid, carbonic acid, citric acid, and the like. One of these acids may be used alone, or two or more thereof may be used in combination.

The temperature at which the acid treatment is to be performed varies depending on the kind and concentration of the acid used and the treatment period. It is, however, preferred to conduct the treatment at 100° C. or lower.

The period over which the acid treatment is to be performed varies depending on the kind and concentration of the acid used and the treatment temperature. However, the treatment period is preferably 10 seconds to 5 hours from the standpoint of production efficiency, and is more preferably 1 minute to 2 hours.

The concentration of the solution for performing the acid treatment varies depending on the kind of the acid used, the treatment period, and the treatment temperature. However, concentrations which are less apt to incur the risk of container corrosion are preferred. Specifically, a concentration of 0.1 wt % to 20 wt % is preferred.

The low-density layer is removed by the alkali treatment which will be described later. Because of this, the thicker the low-density layer, the more the glass sheet surfaces are apt to be removed. Although the thickness of the low-density layer is as stated above, the thickness thereof is preferably 300 nm or larger, more preferably 500 nm or larger, further preferably 600 nm or larger, from the standpoint of the amount of glass surface removal It is preferable that the density of the low-density layer is lower than the density of the region (bulk) lying beneath the compressive stress layer formed by the ion exchange, from the standpoint of glass sheet surface removability.

The thickness of the low-density layer can be determined from the period ($\Delta\theta$) measured by X-ray reflectometry (XRR).

The density of the low-density layer can be determined from the critical angle ($\theta c$) measured by XRR.

In a simplified method, formation of a low-density layer and the thickness of the layer can be ascertained through an examination of a cross-section of the glass with a scanning electron microscope (SEM).

(Step (c): Step of Contacting with Alkali)

In the production process of the present invention, the glass sheet which has undergone the step of contacting with an acid is subsequently subjected to a step in which the glass sheet is contacted with an alkali (alkali treatment step). After the acid treatment and before the alkali treatment, the glass sheet may be subjected to the same step of glass sheet washing as the washing performed in step (a).

The alkali treatment is conducted by immersing the chemically strengthened glass sheet, which has undergone the acid treatment, in a basic solution. By this treatment, some or all of the low-density layer can be removed.

The solution is not particularly limited so long as the solution is basic and has a pH of higher than 7. Either a weak base or a strong base may be used. Specifically, examples of preferred bases include sodium hydroxide, potassium hydroxide, potassium carbonate, sodium carbonate, and the like. One of these bases may be used alone, or two or more thereof may be used in combination.

The temperature at which the alkali treatment is to be performed varies depending on the kind and concentration of the base used and the treatment period. However, the temperature is preferably 0-100° C., more preferably 10-80° C., especially preferably 20-60° C. Such a temperature range is preferred because there is no concern of glass sheet corrosion.

The period over which the alkali treatment is to be performed varies depending on the kind and concentration of the base used and the treatment temperature. However, the treatment period is preferably 10 seconds to 5 hours from the standpoint of production efficiency, and is more preferably 1 minute to 2 hours.

The concentration of the solution for performing the alkali treatment varies depending on the kind of the base used, the treatment period, and the treatment temperature. However, the concentration thereof is preferably 0.1 wt % to 20 wt % from the standpoint of glass sheet surface removability.

By the alkali treatment, some or all of the low-density layer, into which H has penetrated, is removed. Thus, a chemically strengthened glass sheet having improved surface strength can be obtained. It is preferable that after the alkali treatment also, the glass sheet is subjected to a step for washing the glass sheet in the same manner as described above.

(Formation of the Inorganic Film)

The inorganic film is formed on at least one of the surfaces of the glass sheet or chemically strengthened glass sheet obtained above. Although details of the inorganic film are as described above, the high-refractive films are more preferably a nitride, oxynitride, or oxide of one or more elements selected from the group consisting of Si, Al, Ti, Ta, Hf, and Zr, and are even more preferably $SiN_x$. Meanwhile, the low-refractive films are even preferably an oxide of one or more elements selected from the group consisting of Si, Al, and Zr, and are even more preferably $SiO_2$.

It is preferred to form a low-refractive film on at least one surface of the glass sheet or chemically strengthened glass sheet and form a high-refractive film on this low-refractive film, from the standpoint of improving the adhesion of the multilayer film to the glass sheet or chemically strengthened glass sheet. It is also preferred to form a low-refractive film so as to constitute the outermost surface of the inorganic film, from the standpoints of optical property and adhesion to the antifouling film to be formed on the surface of the multilayer film, i.e., so as to form an outermost surface of the cover glass.

Although the total thickness of the high-refractive films and low-refractive films is 850 nm to 6,000 nm, this thickness is not attained by forming one film having said thickness. A single high-refractive film and a single low-refractive film which each have a thickness of 5 nm to 250 nm are alternately superposed to form six or more layers thereof so as to result in a total thickness thereof within that range. Thus, a cover glass reduced in warpage is obtained while maintaining the scratch resistance attributable to the high-refractive films. In addition, the low reflecting properties due to the low-refractive films can be imparted, and scratch propagation can be stopped at the interface between a high-refractive film and a low-refractive film.

The high-refractive films can be formed by a sputtering method or an after-reaction sputtering method, and are more preferably formed by an after-reaction sputtering method.

The low-refractive films can be formed by a sputtering method or an after-reaction sputtering method, and are more preferably formed by an after-reaction sputtering method.

The total number of the superposed high-refractive films and low-refractive films is preferably 20 or larger (ten or more high-refractive films and ten or more low-refractive films), but is preferably 100 or less (up to fifty high-refractive films and up to fifty low-refractive films). The overall thickness of the multilayer film including the superposed high-refractive films and low-refractive films is preferably 1,500 nm or larger, but is preferably 3,000 nm or less.

It is preferable that the total thickness of the high-refractive films is larger than the total thickness of the low-refractive films.

(Formation of Antifouling Film)

As a method for forming an antifouling film, use can be made, for example, of a vacuum deposition method (dry process) in which a fluorine-containing organic compound or the like is vaporized in a vacuum chamber and deposited on the surface of the inorganic film and a method (wet process) in which a fluorine-containing organic compound or the like is dissolved in an organic solvent so as to result in a given concentration and this solution is applied to the surface of the inorganic film.

Examples of the dry process include an ion-beam-assisted deposition method, ion plating, sputtering, and plasma CVD. The wet process can be suitably selected from among spin coating, dip coating, casting, silt coating, spraying, etc.

Although either a dry process or a wet process can be used, it is preferred to use a dry film deposition method from the standpoint of scratch resistance.

One or more materials for constituting the antifouling film can be suitably selected from among fluorine-containing organic compounds and the like which are capable of imparting at least one property selected from the group consisting of antifouling properties, water repellency, oil repellency, and oleophilicity. Specific examples thereof include fluorine-containing organosilicon compounds and hydrolyzable fluorine-containing organic compounds. However, any material capable of imparting the properties such as antifouling properties, water repellency, oil repellency, and oleophilicity can be used without particular limitations.

The thickness of the antifouling film which is usually formed on the surface of the inorganic film so as to constitute an outermost surface of the cover glass is not particularly limited. However, the thickness thereof is preferably 2 nm to 20 nm, more preferably 2 nm to 15 nm, even more preferably 3 nm to 10 nm.

Thicknesses thereof not less than 2 nm are preferred because the outermost surface of the cover glass is in the state of being evenly covered with the tightly adhered antifouling film to enable the cover glass to have high scratch resistance and more withstand practical use. Meanwhile, thicknesses thereof not larger than 20 nm are preferred because this cover glass including the superposed antifouling film has highly satisfactory optical properties.

<Methods for Evaluating the Cover Glass>

The cover glass according to the present invention is suitable for use as cover glasses in the flat panel display devices or touch panel display devices of digital cameras, mobile phones, personal digital assistants (PDAs), etc. In particular, the cover glass of the present invention is more suitable for use as thin cover glasses such as cover glasses for electronic terminals, e.g., mobile phones and personal digital assistants (PDAs).

(Stress Values of Single Films)

Low-refractive films and high-refractive films are formed on at least one surface of a glass sheet or a chemically strengthened glass sheet. From the standpoint of reducing the warpage amount of the cover glass, it is preferable that the absolute value of the stress value of the film including a high-refractive-index material is smaller than the absolute value of the stress value of the film including a lowrefractive-index material. It is also preferable that the stress value of the film including a high-refractive-index material is larger than the stress value of the film including a low-refractive-index material. Meanwhile, the absolute value of the stress value of each single high-refractive film is preferably 30-250 MPa, more preferably 50-250 MPa. The absolute value of the stress value of each single low-refractive film is preferably 100-300 MPa.

The stress value of each single high-refractive film and that of each single low-refractive film can be measured by the measuring method shown below.

The mirror surface of a cleaned silicon wafer having a diameter of 100 mm and a thickness of 0.525 mm is examined with a thin-film stress deposition device (FLX-2320, manufactured by KLA Tencor Corp.), and the surface shape of a diameter portion thereof which passes through the center of the silicon wafer is determined over a length of 90 mm and recorded. Subsequently, a portion of the examined silicon wafer which lies outside the portion where surface shape was determined and which has a width of 5 mm and a length of 10 mm is masked with a Kapton tape. This silicon wafer is set in a film deposition device so that a thin film is deposited on the portion where surface shape was determined, and film deposition is conducted to form a single film having a desired thickness of 3 µm. After the film deposition, the Kapton tape for masking is peeled off, and the residual pressure-sensitive adhesive of the Kapton tape is removed with ethanol. This silicon wafer is examined with a stylus type film thickness meter (DEKTAK 6M, manufactured by BRUKER GmbH) to measure a level difference between the portion which has been masked and the portion which has not been masked, thereby measuring the thickness of the film deposited. Next, the silicon wafer which has undergone the film deposition is examined again with the thin-film stress deposition device to determine the surface shape and radius of curvature of the same portion as that examined before the film deposition. The thickness and Young's modulus of the silicon wafer and the thickness of the thin film are inputted to the thin-film stress deposition device, and the internal stress of the film is calculated from the radii of curvature respectively determined before and after the film deposition.

(Overall Stress Value of Inorganic Film)

A single high-refractive film and a single low-refractive film which each have a thickness of 5 nm to 250 nm are alternately superposed to form six or more layers, thereby depositing an inorganic film having an overall thickness of 850 nm to 6,000 nm.

From the standpoint of reducing the warpage amount of the cover glass, the overall stress value of the inorganic film is 80 MPa or less, preferably 35 MPa or less, more preferably 25 MPa or less.

The overall stress value of the inorganic film can be determined by the following measuring method.

(Measuring Conditions)

The mirror surface of a cleaned silicon wafer having a diameter of 100 mm and a thickness of 0.525 mm is examined with a thin-film stress deposition device (FLX-2320, manufactured by KLA Tencor Corp.), and the surface shape of a diameter portion thereof which passes through the center of the silicon wafer is determined over a length of 90 mm and recorded. Subsequently, a portion of the examined silicon wafer which lies outside the portion where surface shape was determined and which has a width of 5 mm and a length of 10 mm is masked with a Kapton tape. This silicon wafer is set in a film deposition device so that thin films are deposited on the portion where surface shape was determined, and film deposition is conducted. After the film deposition, the Kapton tape for masking is peeled off, and the residual pressure-sensitive adhesive of the Kapton tape is removed with ethanol. This silicon wafer is examined with a stylus type film thickness meter (DEKTAK 6M, manufactured by BRUKER GmbH) to measure a level difference between the portion which has been masked and the portion which has not been masked, thereby measuring the thickness of the films deposited. Next, the silicon wafer which has undergone the film deposition is examined again with the thin-film stress deposition device to determine the surface shape and radius of curvature of the same portion as that examined before the film deposition. The thickness and Young's modulus of the silicon wafer and the thickness of the thin films are inputted to the thin-film stress deposition device, and the internal stress of the films is calculated from the radii of curvature respectively determined before and after the film deposition.

(Scratch Resistance)

The scratch resistance of a cover glass can be evaluated by rubbing the surface of the deposited films of the sample using a traverse type abrasion tester under the test conditions shown below and visually examining the surface for scratches. The number of scratches thus observed is preferably 3 or less, more preferably zero. (Test Conditions) Abrasive cloth, G #320 (complying with JIS R6251:2006); load, 100 g; stroke width, 40 mm; number of strokes, 50 reciprocations; abrasion area, 1 cm$^2$.

(Warpage Amount: Evaluation 1)

The warpage amount of a cover glass can be measured with a three-dimensional shape measuring device (manufactured, for example, by Mitaka Kohki Co., Ltd.) or a surface roughness/contour shape measuring device (manufactured, for example, by Tokyo Seimitsu Co., Ltd.).

The warpage change between the warpage amount of the glass sheet by itself on which no inorganic film has been superposed and the warpage amount of the cover glass according to the present invention, in which an inorganic film has been superposed, is 30% or less, more preferably 20% or less.

The warpage amount of the glass sheet by itself and the warpage amount of the cover glass, in which an inorganic film has been superposed, are each represented by {(warpage amount of the glass)/(thickness of the glass)} (%); the difference between the values thereof corresponds to the "warpage change (%)" according to the present invention.

(Warpage Amount: Evaluation 2)

In cases when the cover glass of the present invention is placed on a horizontal platen so that one main surface of the cover glass is in contact with the platen and the warpage amounts of the cover glass, which are the amounts in which the four corners of the cover glass have lifted from the platen, are measured with a gap gauge at 20° C., then the average value of the warpage amounts is 400 µm or less, preferably 300 µm or less, more preferably 200 µm or less.

EXAMPLES

The present invention is explained below in detail with reference to Examples, but the present invention is not limited thereto.

<Evaluation Methods>

Various evaluations in the following Examples were made by the following analysis methods.

(Scratch Resistance)

For evaluating the hardness of the surface of a cover glass, the scratch resistance was evaluated using a traverse type abrasion tester. Specifically, the evaluation was made in accordance with the Test Conditions described above. That is, reciprocating friction was given between the sample and the abrader to which an abrasive cloth (G #320 (complying with JIS R6251:2006) had been applied, while imposing a contact load thereon, and whether the film surface received scratches was examined. The width of the reciprocations was 40 mm, the speed of the reciprocations was 20 mm/min, the number of the reciprocations was 50, the load was 100 g, and the abrasion area was 1 cm$^2$.

In the evaluation of scratch resistance, it is preferable that the film surface which has undergone the evaluation has no scratches. No scratches on the film surface after the evaluation indicates that sufficient scratch resistance can be maintained.

(Warpage Amount: Evaluation 1)

Three glass sheets (100 mm×100 mm; 0.56 mm(t)) on which an inorganic film had not been deposited were prepared. The warpage amounts thereof were measured with a surface roughness/contour shape measuring device Surfcom (manufactured by Tokyo Seimitsu Co., Ltd.). Subsequently, an inorganic film was deposited. The two diagonals of a 90-mm-square glass of each of these substrates, the square glass having a center common with the 100-mm-square glass and having sides respectively parallel with the sides of the 100-mm-square glass, were examined for warpage with the surface roughness/contour shape measuring device Surfcom (manufactured by Tokyo Seimitsu Co., Ltd.) in the same manner as for the glass sheets with no deposited film. An average of the warpage amounts of the three substrates was taken as the warpage amount of the cover glass including the superposed inorganic film. In the evaluation of warpage amount (evaluation 1), it is preferable that the warpage change of the glass through the superposition of the inorganic film is 30% or less, and is more preferably 20% or less. In cases when the warpage change of the glass is 30% or less, this glass can be used as a cover glass sufficiently reduced in warpage.

(Warpage Amount: Evaluation 2)

Three cover glasses in which an inorganic film had been superposed (100 mm×100 mm; 0.56 mm(t)) were prepared. Each cover glass was placed on a horizontal platen so that one main surface of the cover glass was in contact with the platen, and the warpage amounts in which the cover glass had lifted from the platen were measured with a gap gauge at 20° C. An average of the warpage amounts of the four corners of each of the three cover glasses was taken as the warpage amount of the cover glasses.

The gap measurement by the gap gauge method was conducted in the following manner. First, each cover glass to be examined, which had an approximately polygonal surface shape, was placed on a flat and horizontal platen having no warpage. Next, the distance between each of the portions of the glass which corresponded to the vertexes of the approximately polygonal shape (hereinafter referred to as "corner portions") and the platen was measured with a gap gauge. Any glass gap gauge complying with JIS B7524:2008 can be utilized, and the gap was measured down to the order of 0.01 mm. In the evaluation of warpage amount (evaluation 2), the average of the warpage amounts is preferably 400 μm or less, more preferably 300 μm or less. In cases when the average of the warpage amounts is 400 μm or less, this cover glass can be used as a cover glass sufficiently reduced in warpage.

(Property Evaluation of Films Including High-Refractive-Index Material and Films Including Low-Refractive-Index Material)

The single-film thicknesses and the number of the films including a high-refractive-index material and/or a low-refractive-index material which were superposed in a cover glass were determined through an examination of a cross-section with a scanning electron microscope (S-3400NX, manufactured by Hitachi High-Technologies Corp.). The sum of the thicknesses of the individual single films was taken as the total thickness of the films.

Example 1

(Preparation of Chemically Strengthened Glass)

Into a cup made of stainless steel (SUS) were introduced 9,700 g of potassium nitrate, 890 g of potassium carbonate, and 400 g of sodium nitrate. The contents were heated to 450° C. with a mantle heater to prepare molten salts having a potassium carbonate concentration of 6 mol % and a sodium concentration of 10,000 ppm by weight.

Aluminosilicate glass A having dimensions of 100 mm×100 mm×0.56 mm (specific gravity, 2.48) was prepared, preheated to 200-400° C., subsequently immersed in the molten salts at 450° C. for 2 hours to conduct ion exchange, and then cooled to around room temperature. Thus, a chemical strengthening treatment was performed. The chemically strengthened glass obtained was washed with water and subjected to the next step.

Glass composition (in terms of mol % on the basis of oxides): 64.4% $SiO_2$, 8.0% $Al_2O_3$, 12.5% $Na_2O$, 4.0% $K_2O$, 10.5% MgO, 0.1% CaO, 0.1% SrO, 0.1% BaO, 0.5% $ZrO_2$ Subsequently, 6.0 wt % nitric acid was prepared in a beaker, and the temperature thereof was adjusted to 40° C. using a water bath. The glass obtained in the chemical strengthening step was immersed in the prepared nitric acid for 120 seconds to perform an acid treatment. Thereafter, the glass was washed with water.

Next, a 4.0 wt % aqueous solution of sodium hydroxide was prepared in a beaker, and the temperature thereof was adjusted to 40° C. using a water bath. The glass which had been washed after the step of contacting with acid was immersed in the prepared aqueous sodium hydroxide solution for 120 seconds to perform an alkali treatment. Thereafter, the glass was washed with water and then dried by air blowing.

Thus, a chemically strengthened glass sheet was obtained.

(Formation of Inorganic Film)

Subsequently, multilayer film deposition of silicon nitride films and silicon oxide films was conducted on one surface of the obtained chemically strengthened glass sheet by an after-reaction sputtering method. A silicon oxide film was deposited on the outermost surface of the glass sheet. The refractive index at 632-nm wavelength of each single silicon nitride film obtained was 1.95, and that of each single silicon oxide film obtained was 1.47.

The thickness of each of the single silicon nitride films was regulated to 6 nm to 162 nm, and the thickness of each of the single silicon oxide films was regulated to 5 nm to 42 nm. Deposition of a silicon oxide film and deposition of a silicon nitride film were alternately conducted multiple times to obtain a cover glass including an inorganic film which included forty-five silicon oxide films alternating with forty-five silicon nitride films and which had an overall thickness of 3,000 nm.

The after-reaction sputtering conditions used for the deposition of the films including a high-refractive-index material (silicon nitride films) were as follows, and the resultant high-refractive films were compressive stress layers.

After-reaction sputtering apparatus, trade name ULDis, manufactured by ULVAC, Inc.; target, p-Si target; deposition gas, Ar (flow rate, 50 sccm); sputtering power, 6 kW; nitriding gas, $N_2$ (flow rate, 100 sccm); nitriding power, 1 kW; substrate temperature, ordinary temperature; deposition rate, 0.2 nm/min.

The after-reaction sputtering conditions used for the deposition of the films including a low-refractive-index material (silicon oxide films) were shown below. Target, p-Si target; deposition gas, Ar (flow rate, 40 sccm); sputtering power, 6 kW; oxidizing gas, $O_2$ (flow rate, 100 sccm); oxidizing power, 1 kW; substrate temperature, ordinary temperature; deposition rate, 0.3 nm/min.

The high-refractive films obtained had low compressive stress. The proportion of the thickness of the high-refractive-index films to the total film thickness was large, and the substrate was reduced in warpage. This cover glass showed satisfactory scratch resistance.

Example 2

A chemically strengthened glass was produced in the same manner as in Example 1, and a cover glass including a superposed inorganic film having an overall thickness of 2,000 nm was produced. The single-film thicknesses and the numbers of superposed layers in the inorganic film are as shown in Table 1.

The high-refractive films obtained had low compressive stress. The proportion of the thickness of the high-refractive-index films to the total film thickness was large, and the substrate was reduced in warpage. This cover glass showed satisfactory scratch resistance.

Example 3

A cover glass including a superposed inorganic film having an overall thickness of 3,000 nm was produced in the same manner as in Example 1, except that the deposition of silicon nitride films was conducted under the following conditions. The single-film thicknesses and the numbers of superposed layers in the inorganic film are as shown in Table 1.

The after-reaction sputtering conditions used for the deposition of the films including a high-refractive-index material (silicon nitride films) are as follows, and the resultant high-refractive films were tensile stress layers.

After-reaction sputtering apparatus, trade name ULDis, manufactured by ULVAC, Inc.; target, p-Si target; deposition gas, Ar (flow rate, 100 sccm); sputtering power, 6 kW; nitriding gas, $N_2$ (flow rate, 100 sccm); nitriding power, 1 kW; substrate temperature, ordinary temperature; deposition rate, 0.2 nm/min.

The high-refractive films obtained had tensile stress, and this stress served to countervail the compressive stress of the silicon oxide films (low-refractive films), resulting in a further reduction in substrate warpage. This cover glass showed satisfactory scratch resistance.

Comparative Example 1

The conditions used for depositing the films including a high-refractive-index material in Example 1 were changed to obtain a cover glass configured of the chemically strengthened glass sheet and, deposited thereon, an inorganic film consisting only of a single layer of a silicon nitride film having a single-layer thickness of 3,000 nm. This cover glass showed satisfactory scratch resistance but had large substrate warpage.

Comparative Example 2

An inorganic film having a configuration obtained by alternately superposing two layers of $SiO_2$ as low-refractive films and two layers of $Nb_2O_5$ as high-refractive films, i.e., composed of four layers in total {glass sheet/$Nb_2O_5$ (10 nm)/$SiO_2$ (10 nm)/$Nb_2O_5$ (100 nm)/$SiO_2$ (80 nm)}, was deposited on a chemically strengthened glass sheet prepared by the same method as in Example 1. The conditions used for depositing the $SiO_2$ films were the same as for the $SiO_2$ films in Example 1. The refractive index at 632-nm wavelength of $Nb_2O_5$ is 2.25.

The after-reaction sputtering conditions used for the deposition of the films ($Nb_2O_5$) including a high-refractive-index material are as follows.

After-reaction sputtering apparatus, trade name ULDis, manufactured by ULVAC, Inc.; target, Nb target; deposition gas, Ar (flow rate, 100 sccm); sputtering power, 4 kW; oxidizing gas, $O_2$ (flow rate, 100 sccm); oxidizing power, 1 kW; substrate temperature, ordinary temperature; deposition rate, 0.3 nm/min.

The substrate showed reduced warpage because of the small film thickness. However, the scratch resistance was low.

Comparative Example 3

A chemically strengthened glass sheet was produced in the same manner as in Example 1, and a cover glass including a superposed inorganic film having an overall thickness of 415 nm was produced. The single-film thicknesses and the numbers of superposed layers in the inorganic film are as shown in Table 1. A silicon oxide film, which was a low-refractive film, was deposited on the surface of the glass sheet, and a silicon oxide film, which was a low-refractive film, was deposited so as to constitute the outermost surface of the inorganic film.

The substrate showed reduced warpage because of the small film thickness. However, the scratch resistance was low.

Example 4

An inorganic film having a configuration obtained by alternately superposing forty-five layers of $SiO_2$ as low-refractive films and forty-five layers of SiN as high-refractive films, i.e., composed of ninety layers in total, was deposited on a chemically strengthened glass sheet prepared by the same method as in Example 1. The conditions used for depositing the $SiO_2$ films were the same as for the $SiO_2$ films in Example 1. The films including a high-refractive-index material were deposited so as to have enhanced tensile stress. Thus, a cover glass including the superposed inorganic film having an overall thickness of 3,000 nm was produced. The single-film thicknesses and the numbers of superposed layers in the inorganic film are as shown in Table 1. The after-reaction sputtering conditions used for the deposition of the films (SiN) including a high-refractive-index material are as follows.

After-reaction sputtering apparatus, trade name ULDis, manufactured by ULVAC, Inc.; target, p-Si target; deposition gas, Ar (flow rate, 150 sccm); sputtering power, 6 kW;

nitriding gas, $N_2$ (flow rate, 100 sccm); nitriding power, 1 kW; substrate temperature, ordinary temperature; deposition rate, 0.18 nm/min.

The high-refractive films obtained had tensile stress, and this stress served to countervail the compressive stress of the silicon oxide films (low-refractive films), resulting in a further reduction in substrate warpage. This cover glass showed satisfactory scratch resistance.

Example 5

An inorganic film having a configuration obtained by alternately superposing forty-five layers of $Al_2O_3$ as low-refractive films and forty-five layers of SiN as high-refractive films, i.e., composed of ninety layers in total, was deposited on a chemically strengthened glass sheet prepared by the same method as in Example 1. The conditions used for depositing the SiN films were the same as for the SiN films in Example 4. The high-refractive films were deposited so as to have enhanced tensile stress. Thus, a cover glass including the superposed inorganic film having an overall thickness of 3,000 nm was produced. The refractive index at 632-nm wavelength of $Al_2O_3$ is 1.67. The single-film thicknesses and the numbers of superposed layers in the inorganic film are as shown in Table 1.

The after-reaction sputtering conditions used for the deposition of the films ($Al_2O_3$) including a low-refractive-index material are as follows.

After-reaction sputtering apparatus, trade name ULDis, manufactured by ULVAC, Inc.; target, Al target; deposition gas, Ar (flow rate, 50 sccm); sputtering power, 6 kW; oxidizing gas, $O_2$ (flow rate, 100 sccm); oxidizing power, 1 kW; substrate temperature, ordinary temperature; deposition rate, 0.18 nm/min.

The high-refractive films obtained had tensile stress, and this stress served to countervail the compressive stress of the low-refractive films, resulting in a further reduction in substrate warpage. This cover glass showed satisfactory scratch resistance.

Comparative Example 4

A chemically strengthened glass sheet was prepared by the same method as in Example 1. An inorganic film having a configuration obtained by alternately superposing forty-five layers of $SiO_2$ as low-refractive films and forty-five layers of SiN as high-refractive films, i.e., composed of ninety layers in total, was deposited on the glass sheet not by an after-reaction sputtering method but by a reactive sputtering method, in which a gas obtained by mixing a reactive gas, such as oxygen or nitrogen, with a rare gas, such as argon or neon, was introduced into the vicinity of the target. Thus, a cover glass including the superposed inorganic film having an overall thickness of 3,000 nm was produced. Specifically, an Si target was disposed in ULDis (trade name), manufactured by ULVAC, Inc., and a mixed gas composed of Ar as a deposition gas (flow rate, 50 sccm) and $O_2$ gas (flow rate, 100 sccm) was introduced into the vicinity of the target to deposit silicon oxide under the conditions of a sputtering power of 6 kW, ordinary temperature, and a deposition rate of 0.05 nm/min. Likewise, a mixed gas composed of Ar as a deposition gas (flow rate, 50 sccm) and $N_2$ gas (flow rate, 100 sccm) was introduced into the vicinity of the Si target to deposit silicon nitride under the conditions of a sputtering power of 6 kW, ordinary temperature, and a deposition rate of 0.06 nm/min.

The high-refractive films obtained had compressive stress. The substrate obtained showed satisfactory scratch resistance, but had large warpage.

Comparative Example 5

An inorganic film having a configuration obtained by alternately superposing forty-five layers of $Al_2O_3$ as low-refractive films and forty-five layers of SiN as high-refractive films, i.e., composed of ninety layers in total, was deposited, not by an after-reaction sputtering method but by a reactive sputtering method, on a chemically strengthened glass sheet prepared by the same method as in Example 1. Thus, a cover glass including the superposed inorganic film having an overall thickness of 3,000 nm was produced. The conditions for the reactive sputtering are as shown below, and the resultant high-refractive films were tensile stress layers. Specifically, an Al target was disposed in ULDis (trade name), manufactured by ULVAC, Inc., and a mixed gas composed of Ar as a deposition gas (flow rate, 50 sccm) and $O_2$ gas (flow rate, 100 sccm) was introduced into the vicinity of the target to deposit aluminum oxide under the conditions of a sputtering power of 6 kW, ordinary temperature, and a deposition rate of 0.05 nm/min. Likewise, a mixed gas composed of Ar as a deposition gas (flow rate, 50 sccm) and $N_2$ gas (flow rate, 100 sccm) was introduced into the vicinity of an Si target to deposit silicon nitride under the conditions of a sputtering power of 6 kW, ordinary temperature, and a deposition rate of 0.06 nm/min.

The high-refractive films obtained had tensile stress. The substrate obtained showed satisfactory scratch resistance, but had large warpage.

The cover glasses obtained above were evaluated for various properties. The configuration of the films including a high-refractive-index material and/or the films including a low-refractive-index material in each cover glass and the results of the evaluation thereof are shown in Table 1.

In Table 1, with respect to the scratch resistance, "good" indicates that the film surface after the evaluation had no scratches therein, and "poor" indicates that the film surface had one or more scratches therein. With respect to the warpage amount (evaluation 1) in Table 1, "excellent" indicates that the warpage change of the glass through the inorganic-film superposition was 20% or less, "good" indicates that the warpage change was larger than 20% but not larger than 30%, and "poor" indicates that the warpage amount was larger than 30%. Furthermore, with respect to the warpage amount (evaluation 2) in Table 1, "excellent" indicates that the average warpage amount was 300 μm or less, "good" indicates that the average warpage amount was larger than 300 μm but not larger than 400 μm, and "poor" indicates that the average warpage amount was larger than 400 μm.

The absolute value of the product obtained by multiplying the overall thickness of each inorganic film by the overall stress value of the inorganic film is shown in Table 1. In cases when the absolute value of the product obtained by multiplying the overall thickness of the inorganic film by the overall stress value of the inorganic film is within the given range, the glass sheet can be reduced in warpage amount. The absolute value of the product is preferably $220 \times 10^3$ nm·MPa or less, more preferably $100 \times 10^3$ nm·MPa or less, further preferably $70 \times 10^3$ nm·MPa or less, especially preferably $50 \times 10^3$ nm·MPa or less.

According to the cover glasses and glass laminates obtained above, cover glasses and glass laminates in which the glass sheets were remarkably reduced in warpage amount and which showed excellent scratch resistance and had low reflecting properties and excellent optical properties were able to be obtained.

TABLE 1

| | High-refractive films | | | | Low-refractive films | | | | |
|---|---|---|---|---|---|---|---|---|---|
| | High-refractive-index material | Single-film thickness (nm) | Number of superposed single films | Total thickness (nm) | Stress value of single film (MPa) | Low-refractive-index material | Single-film thickness (nm) | Number of superposed single films | Total thickness (nm) | Stress value of single film (MPa) |
| Example 1 | SiN (compressive stress) | 6-162 | 45 | 2500 | −32 | SiO$_2$ | 5-42 | 45 | 500 | −254 |
| Example 2 | SiN (compressive stress) | 5-169 | 23 | 1700 | −32 | SiO$_2$ | 5-39 | 23 | 300 | −254 |
| Example 3 | SiN (tensile stress) | 6-169 | 45 | 2500 | 53 | SiO$_2$ | 5-42 | 45 | 500 | −254 |
| Comparative Example 1 | SiN$_x$ (compressive stress) | 3000 | 1 | 3000 | — | — | — | — | — | — |
| Comparative Example 2 | Nb$_2$O$_5$ | 10-110 | 2 | 110 | −204 | SiO$_2$ | 10-80 | 2 | 90 | −254 |
| Comparative Example 3 | SiN | 9-66 | 4 | 124 | −32 | SiO$_2$ | 11-91 | 5 | 291 | −254 |
| Example 4 | SiN (tensile stress) | 5-169 | 45 | 1800 | 211 | SiO$_2$ | 5-120 | 45 | 1200 | −254 |
| Example 5 | SiN (tensile stress) | 5-169 | 45 | 1800 | 185 | Al$_2$O$_3$ | 5-120 | 45 | 1200 | −110 |
| Comparative Example 4 | SiN (compressive stress) | 5-169 | 45 | 2500 | −241 | SiO$_2$ | 5-42 | 45 | 500 | −246 |
| Comparative Example 5 | SiN (tensile stress) | 5-169 | 45 | 1800 | −241 | Al$_2$O$_3$ | 5-120 | 45 | 1200 | −201 |

| | Overall thickness of inorganic film (nm) | Total number of superposed layers | Overall stress value of inorganic film (MPa) | Scratch resistance | Warpage amount (evaluation 1) | Warpage amount (evaluation 2) | (Overall thickness) × (overall stress value) (×10$^3$ nm·MPa) |
|---|---|---|---|---|---|---|---|
| Example 1 | 3000 | 90 | −72 | good | good | good | −216.0 |
| Example 2 | 2000 | 46 | −74 | good | good | good | −148.0 |
| Example 3 | 3000 | 90 | 15 | good | excellent | excellent | 45.0 |
| Comparative Example 1 | 3000 | 1 | — | good | poor | poor | — |
| Comparative Example 2 | 200 | 4 | −232 | poor | good | good | −46.4 |
| Comparative Example 3 | 415 | 9 | −201 | poor | good | good | −83.4 |
| Example 4 | 3000 | 90 | 23 | good | excellent | excellent | 69.0 |
| Example 5 | 3000 | 90 | 31 | good | excellent | excellent | 93.0 |
| Comparative Example 4 | 3000 | 90 | −243 | good | poor | poor | −729.0 |
| Comparative Example 5 | 3000 | 90 | −232 | good | poor | poor | −696.0 |

INDUSTRIAL APPLICABILITY

According to the present invention, a cover glass which is reduced in substrate warpage while retaining excellent scratch resistance due to the multilayer film can be obtained even in cases when the cover glass is thin like ones for use in electronic terminals and the like.

DESCRIPTION OF THE REFERENCE NUMERALS

1 Glass sheet
2 Film including high-refractive-index material
3 Film including low-refractive-index material

The invention claimed is:

1. A cover glass, comprising:
   a glass sheet, which is a chemically strengthened glass sheet having a compressive stress layer as a surface layer, and has a thickness of 0.2 mm or more and 1 mm or less; and
   an inorganic film superposed on at least one surface of the glass sheet, wherein the inorganic film is a multilayer film including six or more layers formed by alternately superposing a film including a high-refractive-index material having a refractive index at 632-nm wavelength of 1.80 or higher and a film including a low-refractive-index material having a refractive index at the wavelength of less than 1.80, where the films including the high-refractive-index material and the films including the low-refractive-index material each have a single-film thickness of 5 nm to 250 nm, the six or more superposed layers have a total thickness of 850 nm to 6,000 nm, and a total film thickness of the films including the high-refractive-index material is larger than a total film thickness of the films including the low-refractive-index material, wherein the high-refractive-index material is silicon nitride, a warpage change between a warpage amount of the glass sheet by itself and a warpage amount of the cover glass including the superposed inorganic film is 30% or less, and an absolute value of product obtained by multiplying the total thickness of the six or more superposed layers by an overall stress value of the six or more superposed layers is $220\times10^3$ nm·MPa or less.

2. The cover glass according to claim 1, wherein the low-refractive-index material is silicon oxide.

3. The cover glass according to claim 1, wherein the single-film thickness of the film including the low-refractive-index material is smaller than the single-film thickness of the film including the high-refractive-index material.

4. The cover glass according to claim 1, wherein the inorganic film is superposed on the at least one surface of the glass sheet such that a film including the low-refractive-index material is interposed between a film including the high refractive index material and an outermost surface of the glass sheet.

5. The cover glass according to claim 1, wherein an overall thickness of the inorganic film is 850 nm to 3,000 nm.

6. The cover glass according to claim 1, further comprising:
an antifouling film disposed on a surface of the inorganic film.

7. The cover glass according to claim 1, wherein the total film thickness of the films including the high-refractive-index material is at least twice as large as the total film thickness of the films including the low-refractive-index material.

8. The cover glass according to claim 1, wherein the total film thickness of the films including the high-refractive-index material is at least three times as large as the total film thickness of the films including the low-refractive-index material.

9. A cover glass, comprising:
a glass sheet, which is a chemically strengthened glass sheet having a compressive stress layer as a surface layer, and has a thickness of 0.2 mm or more and 1 mm or less; and
an inorganic film superposed on at least one surface of the glass sheet,
wherein the inorganic film includes six or more layers formed by alternately superposing a film including a high-refractive-index material having a refractive index at 632-nm wavelength of 1.80 or higher and a film including a low-refractive-index material having a refractive index at the wavelength of less than 1.80, where the films including the high-refractive-index material and the films including the low-refractive-index material each have a single-film thickness of 5 nm to 250 nm, the inorganic film has an overall thickness of 850 nm to 6,000 nm, and a total film thickness of the films including the high-refractive-index material is larger than a total film thickness of the films including the low-refractive-index material, wherein the high-refractive-index material is silicon nitride,
when the cover glass is placed on a horizontal platen so that one main surface of the cover glass is in contact with the platen and warpage amounts of the cover glass, which are amounts in which four corners of the cover glass have lifted from the platen, are measured with a gap gauge at 20° C., then an average value of the warpage amounts is 400 μm or less, and an absolute value of product obtained by multiplying the overall thickness of the inorganic film by an overall stress value of the inorganic film is $220\times10^3$ nm·MPa or less.

10. The cover glass according to claim 9, wherein the low-refractive-index material is silicon oxide.

11. The cover glass according to claim 9, wherein the single-film thickness of the film including the low-refractive-index material is smaller than the single-film thickness of the film including the high-refractive-index material.

12. The cover glass according to claim 9, wherein the inorganic film is superposed on the at least one surface of the glass sheet such that a film including the low-refractive-index material is interposed between a film including the high refractive index material and an outermost surface of the glass sheet.

13. The cover glass according to claim 9, wherein the overall thickness of the inorganic film is 850 nm to 3,000 nm.

14. The cover glass according to claim 9, further comprising:
an antifouling film disposed on a surface of the inorganic film.

15. A glass laminate, comprising:
a glass sheet, which is a chemically strengthened glass sheet having a compressive stress layer as a surface layer, and has a thickness of 0.2 mm or more and 1 mm or less; and
an inorganic film superposed on at least one surface of the glass sheet,
wherein the inorganic film includes six or more layers formed by alternately superposing a film including a high-refractive-index material having a refractive index at 632-nm wavelength of 1.80 or higher and a film including a low-refractive-index material having a refractive index at the wavelength of less than 1.80, where the films including the high-refractive-index material and the films including the low-refractive-index material each have a single-film thickness of 5 nm to 250 nm, the inorganic film has an overall thickness of 850 nm to 6,000 nm, and a total film thickness of the films including the high-refractive-index material is larger than a total film thickness of the films including the low-refractive-index material, wherein the high-refractive-index material is silicon nitride, and
an absolute value of product obtained by multiplying the overall thickness of the inorganic film by an overall stress value of the inorganic film is $220\times10^3$ nm·MPa or less.

16. The glass laminate according to claim 15, wherein an absolute value of a stress value of the film including the high-refractive-index material is smaller than an absolute value of a stress value of the film including the low-refractive-index material.

17. The glass laminate according to claim 15, wherein the stress value of the film including the high-refractive-index material is larger than the stress value of the film including the low-refractive-index material.

18. The glass laminate according to claim 15, wherein the absolute value of the product obtained by multiplying the overall thickness of the inorganic film by the overall stress value of the inorganic film is $100\times10^3$ nm MPa or less.

19. The glass laminate according to claim 15, wherein the films including the high-refractive-index material each have a single-film stress value, an absolute value of which is 30-250 MPa.

20. The glass laminate according to claim 15, wherein the films including the low-refractive-index material each have a single-film stress value, an absolute value of which is 100-300 MPa.

21. A glass laminate, comprising:
- a glass sheet, which is a chemically strengthened glass sheet having a compressive stress layer as a surface layer, and has a thickness of 0.2 mm or more and 1 mm or less; and
- an inorganic film superposed on at least one surface of the glass sheet, wherein the inorganic film includes six or more layers formed by alternately superposing a film including a high-refractive-index material having a refractive index at 632-nm wavelength of 1.80 or higher and a film including a low-refractive-index material having a refractive index at the wavelength of less than 1.80, where the films including the high-refractive-index material and the films including the low-refractive-index material each have a single-film thickness of 5 nm to 250 nm, the inorganic film has an overall thickness of 850 nm to 6,000 nm, and a total film thickness of the films including the high-refractive-index material is larger than a total film thickness of the films including the low-refractive-index material, wherein the high-refractive-index material is silicon nitride,
- an absolute value of an overall stress value of the inorganic film is 80 MPa or less, and
- an absolute value of product obtained by multiplying the overall thickness of the inorganic film by the overall stress value of the inorganic film is $220\times10^3$ nm·MPa or less.

22. The glass laminate according to claim 21, wherein an absolute value of a stress value of the film including the high-refractive-index material is smaller than an absolute value of a stress value of the film including the low-refractive-index material.

23. The glass laminate according to claim 21, wherein the stress value of the film including the high-refractive-index material is larger than the stress value of the film including the low-refractive-index material.

24. The glass laminate according to claim 21, wherein the absolute value of product obtained by multiplying the overall thickness of the inorganic film by the overall stress value of the inorganic film is $100\times10^3$ nm-MPa or less.

25. The glass laminate according to claim 21, wherein the films including the high-refractive-index material each have a single-film stress value, an absolute value of which is 30-250 MPa.

26. The glass laminate according to claim 21, wherein the films including the low-refractive-index material each have a single-film stress value, an absolute value of which is 100-300 MPa.

* * * * *